Feb. 23, 1932. C. G. OLSON 1,846,270
MACHINE FOR TESTING HOBS, WORMS, AND THE LIKE
Filed Dec. 5, 1927   7 Sheets-Sheet 2

Feb. 23, 1932.    C. G. OLSON    1,846,270

MACHINE FOR TESTING HOBS, WORMS, AND THE LIKE

Filed Dec. 5, 1927    7 Sheets-Sheet 7

INVENTOR
CARL G. OLSON
By Cheever & Cox
ATTY'S

Patented Feb. 23, 1932

1,846,270

UNITED STATES PATENT OFFICE

CARL G. OLSON, OF CHICAGO, ILLINOIS, ASSIGNOR TO ILLINOIS TOOL WORKS, OF CHICAGO, ILLINOIS, A CORPORATION OF ILLINOIS

MACHINE FOR TESTING HOBS, WORMS, AND THE LIKE

Application filed December 5, 1927. Serial No. 237,709.

My invention relates to testing machines for hobs, worms and other objects and the particular purpose of the invention is to provide a machine capable of making a considerable variety of tests; for making them conveniently, and for making them with great accuracy.

Among the contributory objects, it is my purpose to provide a mounting for the contactor and indicator which is open at the center so that the contactor or its connections may occupy a position at or near the central axis so there will be no obstruction for the contactor, and said contactors may come as close to the center as required, or may move across the center.

Another object is to reduce as far as possible the effects of torsion due to the transmission of the driving power to the various operating parts. According to my construction the power, which in the present instance is applied by hand, is interposed between the work spindle and the element which causes the testing head to travel axially in accordance with the lead of the thread of the work. In other words the force derived from the power shaft branches off in one direction to rotate the work, and in another direction to rotate the lead screw, which latter causes the contactor to travel parallel to the axis of the work.

Another object is to provide means whereby the hand-operated driving mechanism may be shifted to different positions in the machine as may be found by the operator to be most convenient to him in operating the machine. It will be understood from further description that in making some of the tests it is necessary for the operator to closely observe the readings on the indicator at one portion of the machine and simultaneously to drive with one of his hands the power device which causes the testing head to travel axially of the work. I have provided means whereby the hand wheel which furnishes the power may be shifted to whatever position the operator finds most convenient in making any given test or dealing with work of any peculiar shape.

Another object is to provide means whereby the head stock spindle may be adjusted angularly with reference to the sleeve which drives it, the purpose being to rotate the work forward or backward about its axis such an amount as may be necessary to bring it into proper relation with the point of the contactor.

Another object is to provide a construction by which the contactor and indicator may be reversible so as to engage one side or the opposite side of the thread of the work as circumstances may demand.

Another object is to provide means whereby the contactor may be reversible to its own axis without requiring the reversal or change of position of the elements in which it is mounted or the elements which it controls.

Another object is to provide means whereby the testing head may be arcuately adjustable about the contact point as a center, for example, means for adjusting the contact lever angularly in a horizontal plane while the contact point remains stationary. One purpose for this is to bring the contactor to an angular position identical with the pressure angle of the work, that is the angle of the slope of the side of the thread or hob tooth to be tested.

Another object is to provide means by which the angle of adjustment just mentioned may be measured.

These and other objects will be understood as I proceed to describe the mechanism shown in the accompanying drawings in which—

Like numerals denote like parts throughout the several views.

In the drawings, the work consists of a hob 1, although it will be understood that other types of work may be tested. The hob is mounted upon an arbor 2 which is supported upon a tail stock center 4 mounted in a tail stock 5 and a head stock center 6 mounted in a head stock 7. The arbor is rotated by means of a dog 8. Other means for supporting and rotating the work may be substituted but according to the present design, the head stock center is formed upon a shank 10 having a conical head 11, as shown in section in Figure 4. At the outer end, a conical sleeve 12 slips over the end of shank 10 and fits into suitable conical bearings in a sleeve 14. The parts are held snugly together by means of a spring washer 16, engaged by the hub of a gear 17, the latter being held in place by nuts 18 which screw onto the outer threaded end of shank 10. Thus when gear 17 is rotated, the work will be rotated in unison with it.

The tail stock 5 and head stock 7 are mounted on a main frame 20 having legs 22. These parts may be greatly varied in design.

Figures 4, 5:
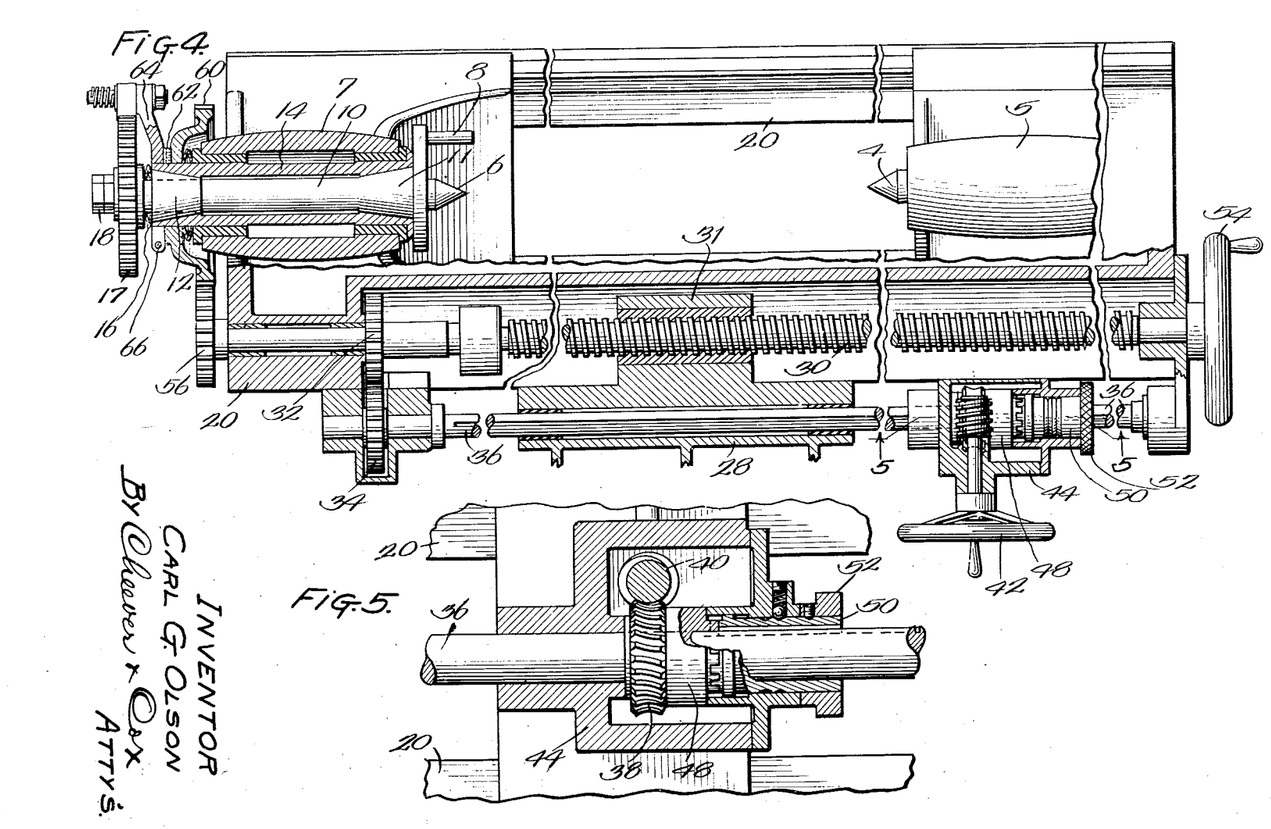
Fig. 4 is a plan view chiefly in section through the axis of the lead screw.
Fig. 5 is a sectional elevation on line 5—5 of Fig. 4.
Figure 6:
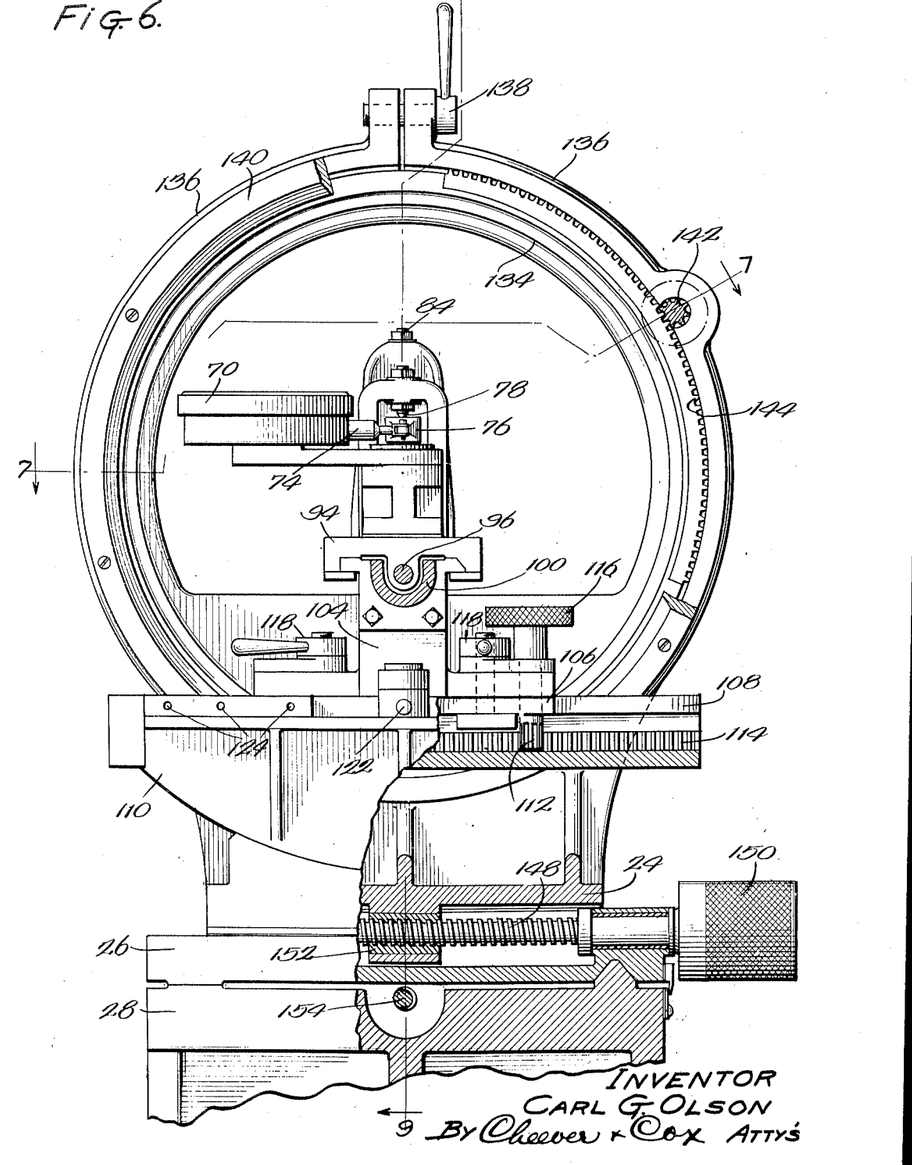
Fig. 6 is a front elevation of the testing head drawn on an increased scale and partly broken away to show certain details of construction. The plane of section is illustrated by the broken line 6—6 of Fig. 2.

The testing head, presently to be described, is mounted upon a testing carriage 24 which in turn is mounted upon a cross-carriage 26, the latter being mounted upon the main carriage 28 is slid lengthwise of the machine by means of a lead screw 30 working in a nut 31 forming part of the main carriage. In testing operations, the lead screw is rotated by a gear 32 meshing with a gear 34 as best shown in Figure 4. Gear 34 is fast upon a power shaft 36 driven by a worm wheel 38 shown in enlarged detail in Figure 5. Said worm wheel 38 is driven by a worm 40 operated by a hand wheel 42. The worm and hand wheel are journaled in a housing 44 which forms what may be termed a "power carriage" which is adjustable lengthwise of shaft 36 for the purpose of bringing it into convenient operating position for the user.

Figure 3:
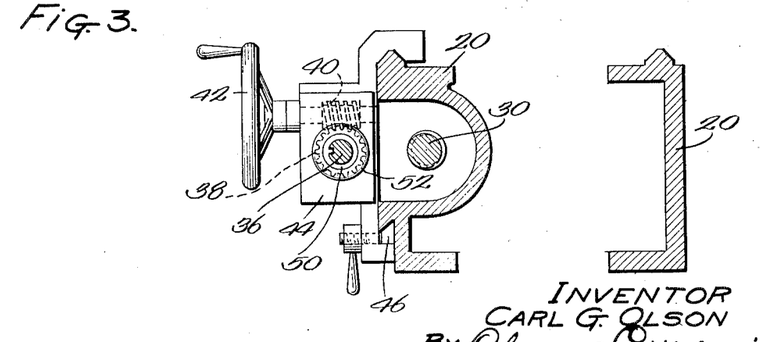
Fig. 3 is a sectional elevation on line 3—3 of Fig. 1.

Carriage 44 slides upon the same ways as the main carriage 28 and may be locked in position by means of a wedge 46 (see Figure 3).

Worm wheel 38 has a hub 48 which clutches into a companion clutch member 50 which is splined to shaft 36 with the result that when the parts are in clutched relation, the rotation of the worm wheel will drive the shaft. Clutch member 50 may be shifted by a knurled head 52 and it is held in in or out position by means of any suitable impositive lock. From the foregoing, it will be evident that the main carriage is moved longitudinally by means of the hand wheel 42 and that said hand wheel is mounted in a power carriage which may be shifted lengthwise of the machine in order to bring it into convenient operating position.

For the purpose of quickly returning the main carriage to initial position, lead screw 30 is provided with a hand wheel 54, which can be rotated only when the power clutch is out of mesh.

Figure 1:
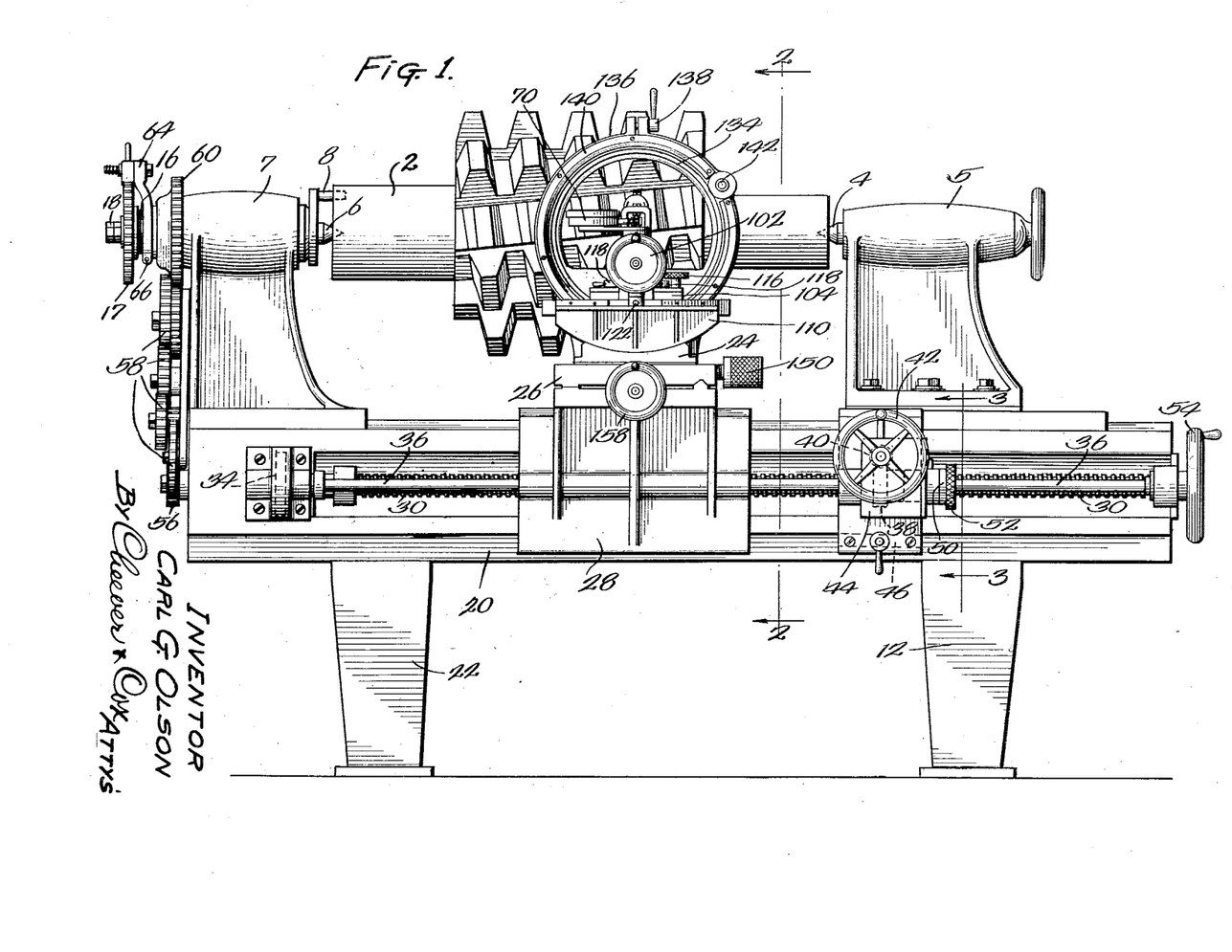
Fig. 1 is a front elevation of the complete machine.
Figure 2:
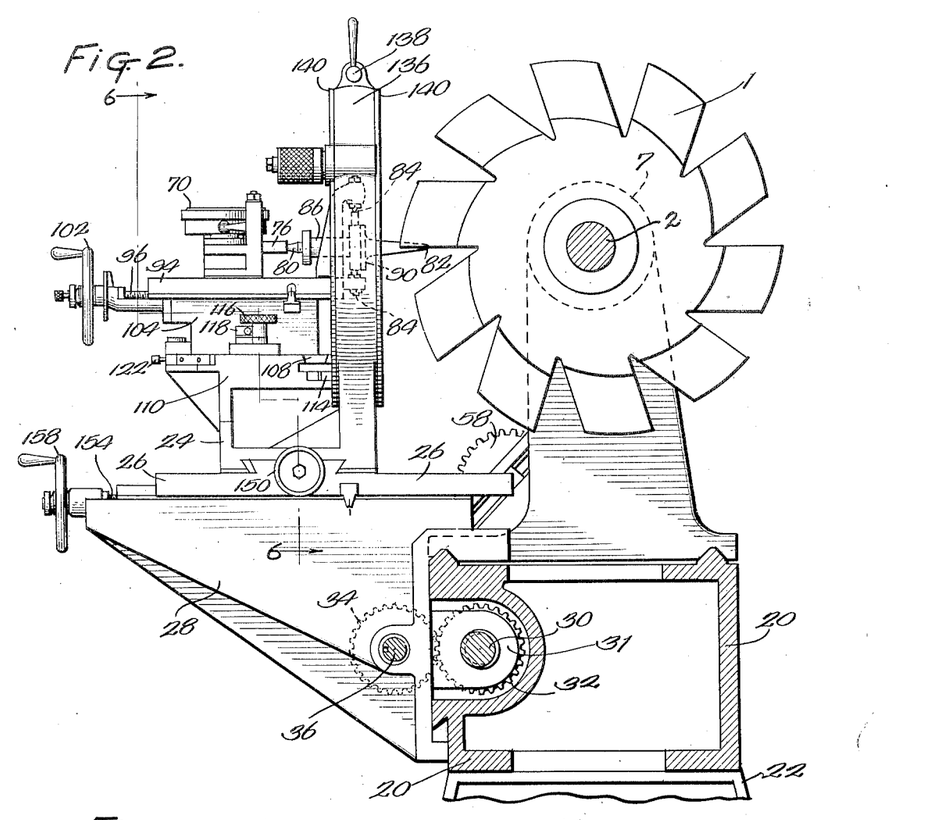
Fig. 2 is a sectional elevation on line 2—2 of Fig. 1.

The power is transmitted from power shaft 36 to the head stock center 6 through a gear train which includes the gear 32 previously mentioned. This gear which is rigidly secured to the lead screw 30 has rigidly attached to it a gear 56 shown at the left end of Figures 1 and 4 and in Figure 8. Power is transmitted from the gear 56 to the gear 17 through a train of gears shown in elevation in Figure 8 and indicated in general by 58.

The final gear 60 of the train is of special shape, as shown in diametral section in Figure 4. It is locked to sleeve 14 by means of a pin 62. Adjacent to this pin is an arm 64 which is clamped to sleeve 14 by means of a split collar 66. Therefore, the parts 14, 60, 62 and 64 rotate as a single piece. At the outer end of arm 64, there is a dog 68 which engages the teeth of gear 17. It will be evident that by adjusting the dog relatively to gear 17, an adjustment may be made between the power shaft and the head stock shank or spindle and by means of this adjustment, the work may be shifted angularly forward or backward. This may be termed an indexing adjustment.

From the above description, it will be evident that the work is rotated by rotating the hand wheel 42 and that this hand wheel may be adjusted lengthwise of the machine for the convenience of the operator and also that provision is made for shifting the work angularly forward or backward to bring it into proper relation to the testing device.

I would call attention to another characteristic, viz.: that when the driving power has reached the gear 32, it is divided into two collateral branches. This will be readily understood by reference to Figure 4 where it will be seen that from gear 32, the force branches toward the right for rotating the lead screw 30, and toward the left for rotating the gear train and the work. The advantage in thus dividing the force is that less strain is imposed upon the force transmitting elements and hence there is less liability of a yielding of the parts due to their elasticity. In a testing machine it is of the utmost importance that great accuracy be obtained. In the manufacture of hobs, for example, it is desirable to indicate an error of anything over two ten-thousandths inch. In my machine, where the force is thus divided, the stress on any individual part is correspondingly reduced and the liability to error correspondingly decreased.

Figure 7:
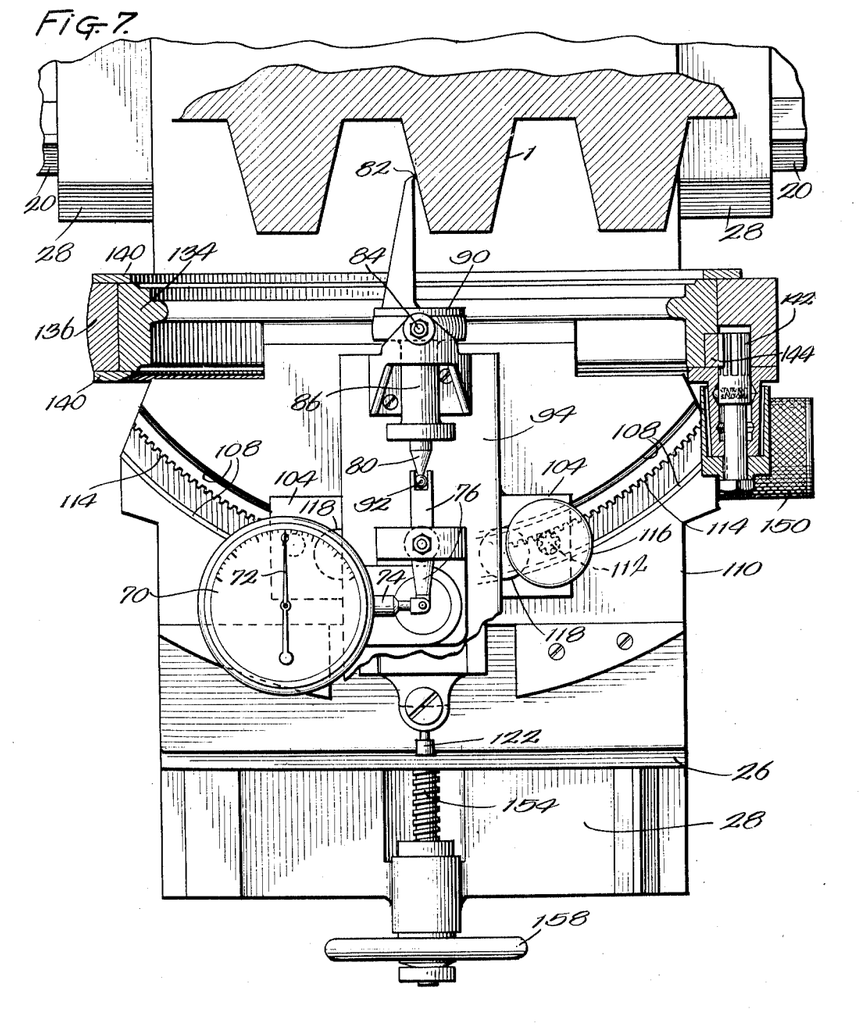
Fig. 7 is a plan section on the line 7—7, Fig. 6.
Figures 8, 9:
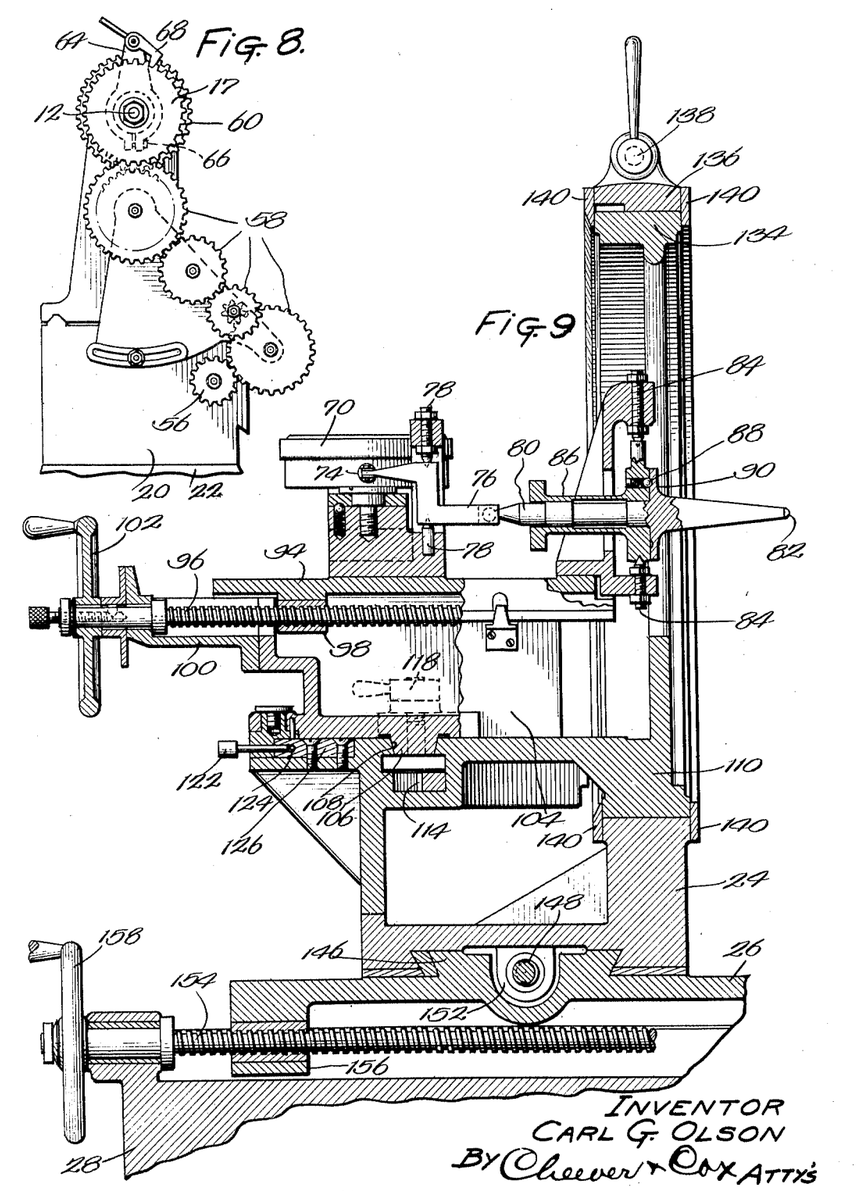
Fig. 8 is an end view showing the change gears and associated parts.
Fig. 9 is a vertical section of the testing head and associated parts.

Now referring more particularly to the testing head and its manner of operation:

The indicator has a dial 70 and pointer 72 as indicated in plan in Figure 7, and in elevation in Figure 9. The pointer is controlled by a plunger 74, pivotally connected at its outer end to an arm or lever 76. This arm is pivotally supported between its ends by point bearings 78 and at its opposite end is articulately connected to the contactor 80. At the forward end of the contactor is a contact point or feeler 82 which makes contact with the work to be tested. The contactor is pivotally supported between its ends by means of point bearings 84.

At times it is desirable to rotate the contactor about its longitudinal axis and I have provided for this by making the contactor in two principal parts, the outer part being a sleeve 86 in which the contactor proper is rotatable. This sleeve carries a spring pressed ball 88, shown in Figure 9, which is adapted to enter suitable depressions in the inner face of disc 90 which constitutes a flange integral with the contactor proper. This ball forms an impositive lock for holding the contactor in any angular position to which it may be adjusted.

An angular adjustment of the contactor about its own axis is permitted by the special form of articulate connection between the contactor and the reversing lever 76, the latter being bifurcated at its forward end and retaining between its branches a spherical head 92.

The parts just described are mounted upon what will be termed "a testing carriage" 94 shown in section in Figure 9. It travels cross-wise relatively to the axis of the work and is controlled by a lead screw 96 working in the lead nut 98 depending from the front of the carriage. This lead screw is journalled in the bracket 100 and is rotated by means of a hand wheel 102.

The testing carriage and its lead screw are mounted upon a quadrant carriage 104 which term I employ because the illustrated form employs a quadrant or arcuate member by which angular adjustment in a horizontal plane may be obtained, so that the contactor when moved radially in and out relative to the work may move along a line having the same obliquity as the pressure angle of the thread or hob tooth to be tested.

By reference to Figures 6, 7, 9 and 10, it will be seen that carriage 104 has an arcuate spline 106 formed on its under side which slides in an arcuate slot 108 formed in the tilting frame.

The arc is centered upon an axis dropped vertically from the contact point 82 when the latter occupies normal position as shown in Figure 9. The quadrant carriage may be angularly adjusted in a horizontal plane by means of a pinion 112 which is rotatable about a vertical axis and engages an arcuate rack 114. Pinion 112 is rotated by means of a knurled head 116. The carriage may be clamped in any angular position by means of clamping bolts 118.

In order to increase the effective length of the rack 114, I have provided two alternative positions for pinion 112 in the quadrant carriage. The pinion may be lifted bodily out from the position shown in Figures 6, 7 and 10 and replaced in a similar bearing 120 at the opposite end of the carriage. By rotating pinion 112, the quadrant carriage may be adjusted through a considerable angular range in a horizontal plane so that the contactor may engage either side of the thread of the screw or the teeth of the hob being tested.

Figure 11:
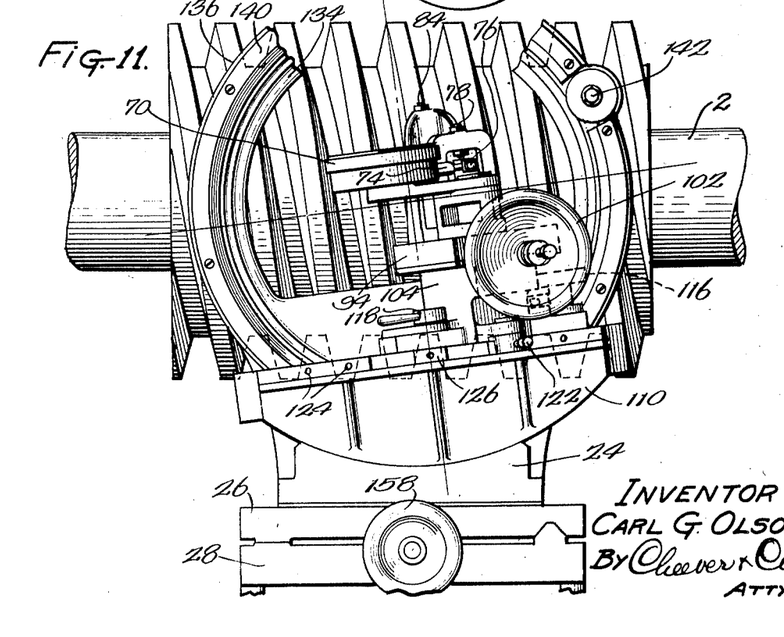
Fig. 11 is a front elevation of the part shown in Fig. 10.

It will be understood that in the ordinary run of work, there are certain standard or commonly used pressure angles and in order that a quick adjustment of the quadrant carriage may be made for these standard angles, I have provided a locking pin 122 which may be dropped into any one of a number of holes 124 formed in the edge of the tilting frame 110, as best shown in Figures 9 and 11.

Figure 10:
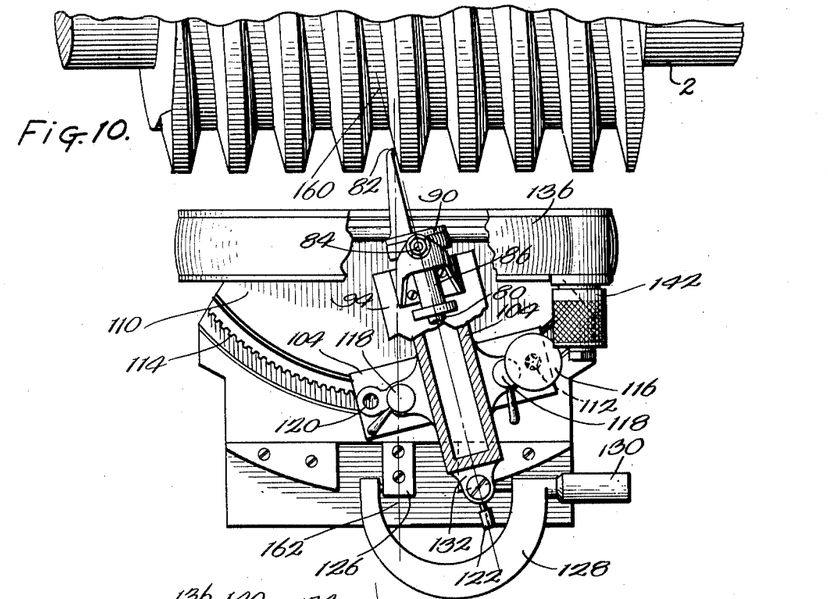
Fig. 10 is a plan view partly in section showing the testing head in contact with a portion of a worm.

I have provided means by which the angle of obliquity in a horizontal plane may be determined trigonometrically. A block 126, shown in plan in Figure 10, is fastened in central position on the tilting frame. This forms a gauge block to be engaged by one of the contactor points of a micrometer gauge 128. The other contactor point 130 of this gauge engages the side of a head 132 formed at the rear end of the quadrant carriage. The measurement shown at the micrometer gauge corresponds to the base of a right angle triangle. The longitudinal axis of the contactor forms the hypotenuse of said triangle which is a known quantity and a constant one. These two factors becoming known, the angle of obliquity may be readily computed.

I will now describe the tilting frame 110 and its mountings. Rising from the forward end of the base of the tilting frame is a ring 134 which is circumferentially enclosed in a housing ring 136. This latter is split into two parts capable of being clamped together at the top by means of a clamping screw 138. The purpose of this split construction and clamping screw is to make it possible to clamp the tilting ring 134 rigidly in any position to which the latter may be adjusted. The housing ring 136 rises from and is unitary with the testing carriage 24. The tilting ring is held in position within the housing ring by means of annular gibs or retaining plates 140. It will thus be evident that the tilting frame has a complete annular bearing which is open at the center. One advantage in having the bearing extend throughout a complete circumference is that it promotes accuracy both in centering the contactor and holding it rigidly against tilting out of its proper plane. The advantage in having a ring of this kind which is open at the center is that it permits the contactor and its support to occupy the central position, the result being that there is no central shaft or support to obstruct or limit the positioning of the contactor at or near the central axis about which the frame tilts.

The position of the tilting frame about its horizontal axis is controlled by means of a pinion 142 cooperating with a rack 144 formed in the periphery of the tilting ring. This pinion is shown in plan view in Figure 7. It is so constructed that it may be withdrawn from engagement with the rack, if desired, and held in withdrawn position by suitable means, for example, an impositive lock. By withdrawing the pinion when the machine is being used for testing, it eliminates the danger of having the angle changed by accidental contact with the pinion.

The testing carriage 24 is adjustable in a direction parallel to the axis of the work. It is guided by ways 146 shown in the lower portion of Figure 9. The position of this carriage is controlled by means of an adjusting screw 148 journaled in the cross-carriage 26 and operated by means of a hand wheel 150, shown in the lower portion of Figure 6. The adjusting screw works in a nut 152 mounted on the bottom of the testing carriage 24. The cross-carriage 26 may be moved transversely to the axis of the work by means of an adjusting screw 154 which works in a nut 156 at the bottom of the carriage 26 and is rotated by a hand wheel 158.

In pratice, a great many different tests may be made, it being possible, for example, to test almost every characteristic of a hob, including pitch, helix angle, pressure angle, contour, top relief, side relief, etc. Testing machines in general are known, and my machine operates upon the usual basic principle of causing the contactor point or feeler 82 to pass over the surface to be tested, the operator at the same time noting the position of the pointer 72 in the indicator 70. To give an illustration, let it be assumed that an ordinary thread is to be tested as shown in Figures 10 and 11. Let it be assumed that the sides of the thread have a slope or pressure angle suitable for cooperating with a gear having ordinary involute teeth. Let it be assumed that it is desired to test the pressure angle of such thread. This will be done by moving the contactor along a line corresponding to the generatrix 160, see Fig. 10. For this purpose, the quadrant carriage will be adjusted angularly in a horizontal plane until the angle lying between the longitudinal axis of the contactor and the central line 162 of the carriage will be equal to the correct pressure angle. This can be computed in the manner explained, by using the micrometer gauge 128. The tilting frame will then be tilted to a degree corresponding to the helix angle of the thread, such position being illustrated in Figure 11. When these adjustments have been made, the contactor will be caused to move radially inwardly and outwardly along the side of the thread and the aberration, if any, at different points will be noted. If the pointer remains at zero, it will prove that the thread has the correct slope.

To test the helical lead, the contactor will be brought into contact with the side of the thread in the same manner as before and the power shaft 36 will be rotated thus causing the work and also the lead screw 30 to rotate, the latter causing the testing head to travel axially of the work. If the pointer remains at zero, it will be proof that the thread has the correct lead.

The fact is that the contactor is universally adjustable and as both radial and axial movements are provided for, it follows that practically any sort of test may be made.

Having thus described my invention, what I claim as new and desire to secure by Letters Patent is:

1. A testing machine having a movable contactor, an indicator influenced thereby, a tilting frame having means for supporting the contactor and indicator, and means for moving the contactor relatively to the frame for passing it over the work, said tilting frame having a ring completely encircling the contactor and an annular bearing in which said ring is mounted, whereby said contactor may be shifted in accordance with the contour of the work piece.

2. A testing machine having a movable contactor, an indicator influenced thereby, a tilting frame having means for supporting the contactor and indicator, and means for moving the contactor relatively to the frame for passing it over the work, said tilting frame having a ring completely encircling the contactor and an annular bearing in which said ring is mounted, said bearing completely surrounding said ring and being split whereby it may be clamped on the ring for holding it in adjusted position.

3. A testing machine having a testing head provided with a contactor for engaging the work to be tested, said testing head having a complete ring open at the center for accommodating the contactor, a housing in which the ring bears, an annular rack on said ring, and a pinion mounted in the housing for rotating the rack and ring to tilt the testing head to various angular positions.

4. A testing machine having a testing head including a tilting frame angularly movable in a vertical plane, a quadrant carriage mounted on said tilting frame and angularly adjustable in a plane substantially perpendicular to the first mentioned plane, a support on said carriage, a contactor and indicator mounted on said support, and means for moving said frame, carriage and support to thereby move said contactor over the surface of the work.

5. A testing machine having a testing head including a tilting frame provided with a vertically arranged ring open at the center, a bearing for said ring, a quadrant carriage mounted on the tilting frame and movable as a unit with the ring of said frame and angularly movable in a plane substantially perpendicular to the plane of the ring, a testing carriage having a support, a contactor and indicator mounted on said testing carriage, and means for moving the testing carriage to cause the contactor to travel over the surface of the work.

6. A testing machine having an elongate contactor provided with an annular flange extending in a plane transverse to the length of the contactor, a bearing in which said contactor is angularly adjustable about its own axis, said bearing being provided with an impositive lock cooperating with said flange by which the contactor may be held in adjusted position and means for supporting said bearing to rotate about an axis at right angles to the longitudinal axis of the contactor.

7. A testing machine having a testing head supporting a contactor having a feeler point, means for rotatably supporting a work piece such as a hob in the vicinity of said testing head, a support for the testing head on which said head is angularly adjustable in a plane parallel to the axis of the work, the axis of adjustment being substantially coincident with a line dropped vertically from the feeler point of the contactor, and a bearing on which said support is adapted to be angularly adjusted about an axis lying in a plane parallel to the work axis.

8. A testing machine having a tilting frame angularly adjustable in a vertical plane, a testing carriage mounted on said tilting frame and movable back and forth in a direction perpendicular to the aforesaid plane, an intermediate carriage for supporting the testing carriage on the tilting frame, said intermediate carriage being angularly adjustable in a plane at right angles to the plane of adjustment of the tilting frame, an elongate contactor movable with said testing carriage and normally extending in the general direction of motion of the testing carriage, whereby to follow the surface contour of the work piece, and an indicator influenced by said contactor.

9. A testing machine having a base, a tilting frame supported thereby and angularly adjustable in a vertical plane, an intermediate carriage mounted on said tilting frame, a testing carriage mounted on the intermediate carriage, an elongate contactor mounted on the testing carriage, an indicator on the testing carriage influenced by the movement of said contactor, the contactor being pivoted between its ends to swing about an axis which is vertical when the tilting frame is in a predetermined position, means for moving the testing carriage back and forth on the intermediate carriage in the direction of the length of the contactor, and means for angularly adjusting the intermediate carriage on the tilting frame in a horizontal plane centered upon a line which is vertical when the tilting carriage is in said predetermined position, said vertical line passing approximately through the work-contacting point of the contactor.

10. A testing machine having a base, a tilting frame supported thereby and angularly adjustable in a vertical plane, an intermediate carriage mounted on said tilting frame, a testing carriage mounted on the intermediate carriage, an elongate contactor having a work-contacting point mounted on the testing carriage, an indicator on the testing carriage influenced by the movement of said contactor, the contactor being pivoted between its ends to swing about an axis which is vertical when the tilting carriage is in a predetermined position, means for moving the testing carriage back and forth on the intermediate carriage in the direction of the length of the contactor, and means for angularly adjusting the intermediate carriage on the tilting frame in a horizontal plane centered upon a line which is vertical when the tilting carriage is in said predetermined position, said vertical line passing approximately through the work-contacting point of the contactor, the tilting frame having an open centered ring surrounding the contactor and approximately concentric therewith, and a bearing for said ring extending more than half way around the ring from said base.

11. A testing machine having a testing head, including a contactor having a work-contacting point supported upon a carriage which is angularly adjustable about an axis passing through said work-contacting point of the contactor, a support for said carriage provided with an annular rack concentric with said axis, a pinion adapted to coact with said rack, and extensions projecting laterally in opposite directions from the central portion of said carriage, each of said extensions having a bearing for said pinion, whereby, by placing the pinion in one or the other of said bearings, the range of angular adjustment of the carriage for a given length of rack may be increased.

12. A testing machine, having an elongate contactor, means for pivotally supporting it between its ends so as to move about a vertical axis, an indicator influenced by said contactor, a testing carriage on which said contactor and indicator are mounted, a second carriage, means for moving the testing carriage back and forth upon the second carriage in the general direction of the length of the contactor, a tilting frame angularly adjustable about an axis substantially concentric with the longitudinal axis of the contactor, the second carriage being angularly adjustable upon the tilting frame about an axis which passes approximately through the acting point of the contactor, and means for locking said second carriage in a different definite and pre-determined angular positions.

13. A testing machine for testing a rotary work piece having a movable elongate contactor having an acting point, an indicator actuated thereby, a testing carriage for supporting the contactor and indicator, an intermediate carriage on which the testing carriage is movable in the general direction of the length of the contactor, a second carriage for supporting the testing carriage, and a base on which the second carriage is angularly adjustable to move the contactor in a plane which contains the axis of the work and the acting point of the contactor, approximately, and means for measuring the angle of adjustment.

14. A testing machine having an elongate contactor, pivotally movable about an axis transverse to its length, an indicator actuated by the angular movement of the contactor, a testing carriage for supporting the contactor and indicator, a second carriage for supporting the testing carriage, means for moving the testing carriage back and forth on the second carriage in the general direction of the length of the contactor, a base for supporting the second carriage, the second carriage being angularly adjustable on said base about an axis which passes approximately through the acting point of the contactor and transversely to the axis of the work, the base having a gauge block centrally located and the testing carriage having a shoulder, said gauge block and shoulder forming measuring devices for determining the base of a right angle triangle for computing the angle of adjustment of the second carriage.

15. A testing machine having a work spindle, a testing carriage, a lead screw for causing the carriage to travel parallel to the axis of the work, a driving shaft connected to the lead screw and to the work spindle for rotating them, said lead screw and driving shaft being adjacently a parallel collar splined to the driving shaft, and a hand operated power device movable along the power shaft and capable of rotating said collar, whereby the power device may be shifted to meet the convenience of the operator.

16. A testing machine having a work spindle, a testing carriage, a lead screw for causing the carriage to travel parallel to the axis of the work on said spindle, a driving shaft connected to the lead screw and to the work spindle for rotating them, a collar splined to the driving shaft, a gear wheel for rotating said collar, a hand wheel for rotating said gear wheel, and a bearing in which the hand wheel is journaled, said bearing being shiftable along the driving shaft whereby the hand wheel, gear wheel and collar are shifted, thus permitting the parts to be shifted to suit the convenience of the operator.

17. A testing machine having a work spindle, a testing carriage, a lead screw for causing the carriage to travel parallel to the axis of the work, a driving shaft connected to the lead screw and to the work spindle for rotating them, a collar splined to the driving shaft, a hand operated power device for driving said shaft slidable along said driving shaft, and clutch means for connecting the power device with said collar, whereby the power device may be connected and disconnected at will and may be shifted along the drive shaft to be brought into convenient position for the operator.

18. A testing machine having a testing head, an elongate work contactor supported by said head, an indicator which is operable in response to the movement of said contactor, annular means surrounding the longitudinal axis of said contactor for holding the testing head at various angles, and a mounting for said annular means.

19. In a testing machine, a rotatable work spindle, an elongate contactor arranged normally transversely to the axis of the spindle, said contactor being pivoted between its ends, an indicator influenced by the pivotal movement of the contactor, a testing carriage movable toward and from the spindle in the general direction of the length of the contactor, and a frame on which said testing carriage is supported and relatively to which it is movable, said frame being pivotally supported upon an axis approximately coincident with the longitudinal axis of the contactor, when the latter is in neutral position.

20. A testing machine for hobs, threads and the like, having a work spindle, a testing carriage movable radially toward and from the work, a contactor pivotally mounted thereon, an indicator carried by the carriage influenced by the pivotal movement of the contactor, a frame having means on which the testing carriage is mounted, and means for pivotally supporting said frame to tilt on an axis lying approximately in a diametrical plane of the work axis, and means for angularly adjusting the testing carriage to conform to the pressure angle of the work, whereby the movement of the testing carriage back and forth towards and from the work causes the contacting point to move in line with the generatrix of the work.

21. A testing machine having a testing carriage movable toward and from the work, a contactor having a feeling point carried by said carriage, and an indicator carried by the carriage and influenced by the contactor, means for angularly adjusting said testing carriage about a vertical axis and about a horizontal axis, said axes, if produced, intersecting at a point lying on the line of travel of the feeling point of the contactor in response to the movement experienced by the testing carriage.

In witness whereof, I have hereunto subscribed my name.

CARL G. OLSON.